Patented Nov. 3, 1953

2,657,971

UNITED STATES PATENT OFFICE 2,657,971

IMPRESSION MATERIAL

Edwin H. Lochridge, Glendale, Calif., assignor to Dental Perfection Company, Glendale, Calif., a corporation of California No Drawing. Application December 10, 1951, Serial No. 260,929

15 Claims. (Cl. 18—47)

This invention relates to a new impression composition. More specifically it relates to a composition for making dental impressions.

For many dental purposes, such as the making of full dentures, partial dentures, bridges, etc., it is necessary for the dentist to be able to accurately reproduce portions of the mouth. These reproductions are made by the use of impression compounds.

My impression material contains a suitable gel forming agent such as sodium potassium or ammonium alginate, sodium or potassium carboxymethyl cellulose or sodium potassium or ammonium pectate. Mixtures of the foregoing gel forming agents may also be used in my new composition.

To the above I add a lead compound, such as lead oxide, basic lead sulfate or lead silicate. Lead silicate in the form of lead monosilicate or lead disilicate is especially suitable. As substitutes for these lead compounds I may also use calcium compounds in the form of calcium sulfate, calcium oxide or calcium hydroxide (slaked lime).

To the above I add a fluosilicate. Most fluosilicates appear to give satisfactory results; however, I prefer to use sodium fluosilicate, potassium fluosilicate, aluminum fluosilicate or ammonium fluosilicate.

To the foregoing I also add a filler such as diatomaceous earth in a finely ground form. Other fillers, such as fuller's earth or talc may also be used.

To the above I also add a compound to control the setting characteristics of the composition. For this purpose I have found the sodium salt of ethylene diamine tetra acetic acid to be very effective. The other alkali metal salts may also be employed. For example, the potassium or lithium salt of ethylene diamine tetra acetic acid also gives satisfactory results. To the above I add sufficient water to form a stiff paste when spatulated (mixed) and then place this cast into a dental tray for taking the impression. In this composition the metal compounds react with the pectates, alginates and alkali metal salts of carboxymethyl cellulose to form a water insoluble gel.

It is therefore an object of the present invention to produce a composition of matter suitable and useful as a dental impression material by blending a metal compound, a filler, a fluosilicate, a gel forming agent, an agent to control setting such as the alkali metal salt of ethylene diamine tetra acetic acid and water.

I have found that the alkali metal salts of ethylene diamine tetra acetic acid function effectively to control the setting characteristics of my new composition. If the alkali metal salt of the ethylene diamine tetra acetic acid, which has the character of a retarder and may be referred to as the retarder salt, is omitted from the composition the rate of reaction between the gel forming agent, such as for example, sodium alginate, and the metal, such as lead, is so rapid that the impression composition sets up to a stiff gel before it can be introduced into the patient's mouth. Therefore, to retard this gelation or set the alkali metal salt is added to the impression composition. As progressively larger amounts of the alkali metal salt of ethylene diamine tetra acetic acid are added to my dental impression composition the setting time is extended. For practical purposes sufficient of the alkali metal salt of ethylene diamine tetra acetic acid is added to my composition to maintain the setting time between 1½ and 15 minutes and preferably from 2 to 5 minutes at 70° F.

Although having in common with retarders, e. g. phosphates and carbonates, previously used in dental impression compositions, the general property of retarding within the practical requirements of impression taking the rate of reaction between the gel forming agent, e. g. an alginate and the metal salt reactive therewith to form a water insoluble elastic gel, the present retarder salt is distinguished from such other retarders not only in its chemical nature, but also in its stabilizing relation to the other components of the material before mixing with water, and thereafter, it appears, in the particular manner in which it performs its retarder function. As to stabilizing properties, it is known that in the presence of moisture or excessive humidity, the usual dry impression materials of the present type, but containing retarders such as the phosphates and carbonates, have their effectiveness and "shelf life" impaired, by reason of premature consumption of some of the retarder by chemical reaction with the gel forming and insolubilizing salt, e. g. calcium sulfate or lead silicate. Thus such usual retarders appear to ionize and become prematurely reactive in the presence of relatively small amounts of moisture.

The present retarder salt is characteristically different with respect to its properties in the dry material, in that neither it nor the initial composition of the material are affected by such increased moisture as would correspond, for example, to high atmospheric humidity. Consequently, the chemical condition and shelf life of the material remain stabilized. The reason why the present retarder behaves in this manner, apparently is that it does not consequently ionize or react with the other constituents of the mixture, even at high humidities, and performs its sequestering and retarder function only in the presence of the relatively great amount of water added when the material is used. It is believed that the sequestering action of the present retarder is essentially a physical effect of the salt, and which is manifested only in the wet mixture.

Ethylene diamine tetra acetic acid has the following structure:

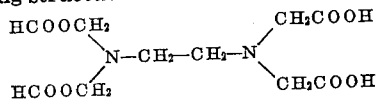

This compound is a substituted carboxy acid of ethylene diamine.

The di-sodium salt of ethylene diamine tetra acetic acid has the following structure:

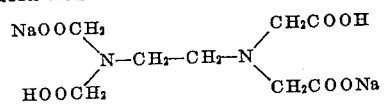

The tri-sodium salt of ethylene diamine tetra acetic acid has the following structure:

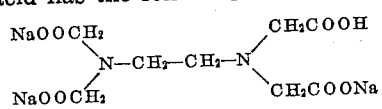

and the tetra-sodium salt of ethylene diamine tetra acetic acid has the following structure:

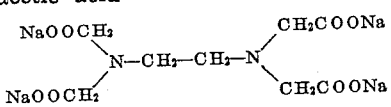

The corresponding potassium and lithium salts of the di, tri and tetra sodium salts of ethylene diamine tetra acetic acid are prepared by substituting either lithium or potassium in place of the sodium in the foregoing di, tri and tetra sodium salts set forth above.

In addition to the use of the tetra alkali metal salt of ethylene diamine tetra acetic acid in my composition I may also use other salts of substituted acids of ethylene diamine in which the acetic acid radical is replaced by the higher organic acid radicals such as the higher saturated and unsaturated carboxy acids including propionic acid and butyric acid.

As a further modification of my invention I may produce an impression material by mixing calcium sulfate with a filler, a gel forming agent, such as an alkali metal salt of alginic, pectic or carboxymethyl cellulose, an alkali metal salt of ethylene diamine tetra acetic acid and water in sufficient amount to produce a plastic mass. In this composition the calcium sulfate reacts with the alkali metal salts of pectic, alginic and carboxymethyl cellulose acids to form a water insoluble gel. When calcium sulfate is used in my composition as the source of the alkaline earth metal sulfate I prefer to use it in the form of CaSO₄.½H₂O. The alkali metal salt of the ethylene diamine tetra acetic acid controls the setting time of the composition.

As a further modification I may also use calcium in the form of the oxide or the hydroxide (slaked lime) as will be shown in the succeeding examples.

The following are examples of my new composition:

*Example I*

The following master batch, or mix, was tumbled in a cone blender:

110 grams diatomaceous earth
24 grams potassium alginate (low viscosity)
10 grams potassium alginate (high viscosity)
85 grams lead monosilicate (an orthosilicate)
3.5 grams of tetrasodium salt of ethylene diamine tetra acetic acid (A) 11.5 grams of the above master batch were blended with 0.1 gram sodium fluosilicate, 0.5 gram calcium sulfate (CaSO₄.½H₂O). To this blend there was added 25 cubic centimeters of water and the mixture was then thoroughly mixed with a spatula. This composition congealed in 1 minute and set in 3 minutes.

(B) 11.5 grams of the above master mix were blended with 0.750 gram of sodium fluosilicate. To this blend there was added 25 cubic centimeters of water at 70° F. and this mixture was thoroughly spatulated (mixed). This final composition congealed in 2¼ minutes and set in 4 minutes.

(C) 11.5 grams of the above master mix were blended with 1.25 grams of aluminum fluosilicate. To this blend there was added 25 cubic centimeters of water at 70° F. and this mixture was thoroughly spatulated (mixed). This final composition congealed in 6 minutes and produced a good set in 10 minutes.

(D) 11.5 grams of the above master mix were blended with 2.0 grams of aluminum fluosilicate. To this blend 25 cubic centimeters of water at 70° F. were added and this mixture was thoroughly spatulated (mixed). This final composition congealed in 1¾ minutes and produced a good set in 4 minutes.

(E) 11.5 grams of the above master mix were blended with 0.5 gram of sodium fluosilicate (Na₂SiF₆) and 0.1 gram calcium sulfate (CaSO₄.2H₂O)

To this blend there was added 25 cubic centimeters of water at 70° F. This final composition congealed in 3¾ minutes at 78° F. and set in 7 minutes.

*Example II*

The following master mix was tumbled in a cone blender:

110 grams diatomaceous earth
24 grams sodium alginate (low viscosity)
10 grams sodium alginate (high viscosity)
85 grams lead monosilicate (an orthosilicate)
3.5 grams of the tetra sodium salt of ethylene diamine tetra acetic acid The low viscosity sodium alginate used in this master batch has a viscosity of 400 centipoises for a 1.0% aqueous solution when obtained at a temperature of 17 degrees centigrade. The high viscosity sodium alginate in this master batch has a viscosity of 1500 centipoises for a 1.0% aqueous solution when obtained at a temperature of 17° centigrade.

(A) 11.5 grams of the above master mix (Example II) were blended with 0.100 gram of sodium fluosilicate. To this blend there was added 25 cubic centimeters of water at 70° F. and this mixture was then thoroughly spatulated (mixed). This composition congealed in 1½ minutes at 78° F. and set in 4 minutes.

(B) 11.5 grams of the above master mix (Example II) were blended with .050 gram of sodium fluosilicate and 0.100 gram of calcium sulfate (CaSO₄.2H₂O). To this blend there was added 25 cubic centimeters of water at 70° F. and this mixture was then thoroughly spatulated (mixed). This composition congealed in 5 minutes at 72° F. and set in 12 minutes.

(C) 11.5 grams of the above master mix (Example II) were blended with 0.200 gram of aluminum fluosilicate. To this blend 25 cubic centimeters of water at 70° F. were added. This mixture was thoroughly spatulated (mixed). This composition congealed in 3 minutes at 72° F. and set in 6 minutes.

(D) 11.5 grams of the above master mix (Example II) were blended with 0.100 gram of potassium fluosilicate. To this blend 25 cubic centimeters of water at 70° F. were added and this mixture was thoroughly spatulated (mixed). This composition congealed in 1¾ minutes at 72° F. and set in 4 minutes.

(E) 11.5 grams of the foregoing master mix (Example II) were blended with .750 gram of calcium sulfate (CaSO₄.2H₂O) and .500 gram of additional tetra sodium salt of ethylene diamine tetra acetic acid. To this blend there was added 25 cubic centimeters of water at 70° F. This composition congealed in 1¼ minutes and set in 3 minutes.

*Example III*

The following master mix or batch was tumbled in a cone blender:

110 grams diatomaceous earth
24 grams potassium alginate (1100 viscosity)
10 grams potassium alginate (high viscosity)
85 grams lead monosilicate (lead orthosilicate)

(A) 11.5 grams of the foregoing master mix (Example III) were blended with 0.350 gram of the disodium salt of ethylene diamine tetra acetic acid and 0.750 gram sodium fluosilicate. To this blend 25 cubic centimeters of water at 70° F. were added and this mixture was thoroughly spatulated (mixed). This composition congealed in 1¾ minutes at 74° F. and set in 4 minutes.

(B) 11.5 grams of the above master mix (Example III) were blended with 0.350 gram of the trisodium salt of ethylene diamine tetra acetic acid and 0.750 gram of sodium fluosilicate. To this blend 25 cubic centimeters of water at 70° F. were added and this mixture was thoroughly spatulated (mixed). This composition congealed in 3¼ minutes and set in 5 minutes.

(C) 11.5 grams of the foregoing master mix (Example III) were blended with 0.700 gram of the trisodium salt of ethylene diamine tetra acetic acid, 0.100 gram of sodium fluosilicate and 0.500 gram of calcium sulfate (CaSO₄.½H₂O). To this blend 25 cubic centimeters of water at 70° F. were added and this mixture was thoroughly spatulated (mixed). This composition congealed in 1¼ minutes and set in 7 minutes.

*Example IV*

The following master batch or mix was tumbled in a cone blender:

100 grams diatomaceous earth
80 grams pectophil L. M. (sodium pectate)
100 grams lead monosilicate (an orthosilicate)

(A) 14 grams of the above master mix (Example IV) were blended with 0.350 gram of the tetrasodium salt of ethylene diamine tetra acetic acid and 0.250 gram of sodium fluosilicate. To this blend 25 cubic centimeters of water at 70° F. were added. This composition set in the bowl while mixing.

(B) 14.0 grams of the above master mix (Example IV) were blended with 0.700 gram of the tetra sodium salt of ethylene diamine tetra acetic acid and 0.100 gram of sodium fluosilicate. To this blend 25 cubic centimeters of water at 70° F. were added and this mixture was thoroughly spatulated (mixed). This composition congealed in 45 seconds.

(C) 14.0 grams of the above master mix (Example IV) were blended with 0.350 gram of the tetra sodium salt of ethylene diamine tetra acetic acid. To this blend 25 cubic centimeters of water at 70° F. were added and this mixture was thoroughly spatulated (mixed). This composition set in 6 minutes.

*Example V*

The following master mix or batch was tumbled in a cone blender (mixing mill):

100 grams diatomaceous earth
200 grams lead monosilicate
20 grams carboxymethyl cellulose (medium viscosity)

(A) 18.0 grams of the foregoing master mix (Example V) were blended with 0.250 gram of the disodium salt of ethylene diamine tetra acetic acid, 0.250 gram of potassium fluosilicate and 0.250 gram of calcium sulfate (CaSO₄.½H₂O). To this blend 25 cubic centimeters of water at 70° F. were added and this mixture was then thoroughly spatulated (mixed). This composition congealed in 2 minutes and set in 5 minutes.

*Example VI*

The following master mix or batch was tumbled in a cone blender:

100 grams diatomaceous earth
24 grams potassium alginate (1100 viscosity)
10 grams potassium alginate (high viscosity)
85 grams lead monosilicate (A) 11.5 grams of the above master mix (Example VI) were blended with 1.0 gram sodium fluosilicate and 0.350 gram of an equal mixture of the tetra potassium salt of ethylene diamine tetra acetic acid and diatomaceous earth. To this blend 25 cubic centimeters of water at 70° F. were added and this mixture was thoroughly spatulated. This composition congealed in 1½ minutes and set in 3 minutes.

(B) 11.5 grams of the above master mix (Example VI) were blended with 0.600 gram of sodium fluosilicate, 0.100 gram of calcium sulfate (CaSO₄.½H₂O) and 0.350 gram of an equal mixture of the potassium salt of ethylene diamine tetra acetic acid and diatomaceous earth. To this blend there was added 25 cubic centimeters of water at 70° F. and this mixture was thoroughly spatulated (mixed). This final composition set in 5 minutes.

*Example VII*

The following materials were mixed together and thoroughly blended:

5.50 grams diatomaceous earth
1.20 grams low viscosity potassium alginate
0.50 gram high viscosity potassium alginate
0.350 gram tetra sodium salt of ethylene diamine tetra acetic acid
0.100 gram sodium fluosilicate
0.600 gram calcium sulfate (CaSO₄.½H₂O)

To the above 25 cubic centimeters of water at 70° F. were added and this mixture was thoroughly spatulated (mixed). This final composition congealed in 2¼ minutes and set in 5 minutes.

Example VIII

The following materials were mixed together and thoroughly blended:

5.5 grams diatomaceous earth
1.2 grams low viscosity potassium alginate
0.5 gram high viscosity potassium alginate
0.350 gram tetra sodium salt of ethylene diamine tetra acetic acid
0.600 gram calcium sulfate ($CaSO_4 \cdot 2H_2O$)

To the above blend 25 cubic centimeters of water at 70° F. were added and the mixture was thoroughly spatulated (mixed). This final composition congealed in 4½ minutes at 74° F. and set in 8 minutes.

Example IX

This example is a further modification of my composition in which slaked lime ($Ca(OH)_2$) has been used as a source of calcium.

The following amounts of material were thoroughly blended or mixed together:

4.5 grams diatomaceous earth
1.2 grams potassium alginate (low viscosity)
0.5 gram potassium alginate (high viscosity)
0.750 gram tetra sodium salt of ethylene diamine tetra acetic acid
1.0 gram of a mixture consisting of 4 parts of diatomaceous earth and 1 part of slaked lime To the above 25 cubic centimeters of water were added at 70° F. After spatulation with the water present this composition congealed in 1½ minutes and set in 10 minutes.

Example X

The following is an example wherein basic lead sulfate has been employed in my composition.

The following amounts of materials were thoroughly mixed or blended:

5.5 grams diatomaceous earth
1.2 grams potassium alginate (low viscosity)
0.5 gram potassium alginate (high viscosity)
0.35 gram tetra sodium salt of ethylene diamine tetra acetic acid
1.0 gram tribasic lead sulfate To the above blend 25 cubic centimeters of water were added at 70° F. and thoroughly mixed with the blend. This composition congealed in ¾ minute and set in 5 minutes.

Example XI

This is another example in which basic lead sulfate is used in my composition.

The following amounts of materials were thoroughly blended and mixed together:

5.5 grams diatomaceous earth
1.2 grams sodium alginate (low viscosity)
0.5 gram sodium alginate (high viscosity)
0.5 gram tetra sodium salt of ethylene diamine tetra acetic acid
0.5 gram sodium fluosilicate
5.0 grams basic lead sulfate (Eagle Picher)

This blend was spatulated with 25 cubic centimeters of water at 70° F. After spatulation this composition congealed in 1¼ minutes and set in 5 minutes.

Example XII

This example is another modification of my composition in which lead oxide has been employed.

The following materials were thoroughly mixed or blended:

5.5 grams diatomaceous earth
2.2 grams sodium alginate (low viscosity)
0.350 gram tetra sodium salt of ethylene diamine tetra acetic acid
0.500 gram sodium fluosilicate
5.0 grams lead oxide This composition was thoroughly mixed with 25 cubic centimeters of water at 70° F. This composition congealed in 1¾ minutes and set in 4 minutes.

I claim:

1. Impression taking material comprising a gel forming agent having an acid radical selected from the group consisting of alginic, pectic and carboxymethyl cellulose acids, an inorganic salt of the class consisting of calcium and lead salts having a metallic ion reactive with said acid radical of the gel forming agent to produce a water insoluble gel, and an alkali metal salt of a tetra carboxy acid of ethylene diamine as a retarder for such reaction.

2. A material as defined in claim 1, in which said inorganic salt is calcium sulfate.

3. A material as defined in claim 1, in which said inorganic salt is lead orthosilicate.

4. A material as defined in claim 1, in which said gel forming agent is an alkali metal alginate.

5. A material as defined in claim 1, in which said gel forming agent is an alkali metal pectate.

6. A material as defined in claim 1, in which said gel forming agent is an alkali metal salt of carboxymethyl cellulose.

7. A material as defined in claim 1, containing also a fluosilicate of the class consisting of sodium fluosilicate, potassium fluosilicate, and aluminum fluosilicate.

8. Impression taking material comprising a gel forming agent having an acid radical selected from the group consisting af alginic, pectic and carboxymethyl cellulose acids, an inorganic salt of the class consisting of calcium and lead salts having a metallic ion reactive with said acid radical of the gel forming agent to produce a water insoluble gel, and an alkali metal salt of the group consisting of di, tri and tetra potassium and sodium salts of ethylene diamine tetra acetic acid.

9. A material as defined in claim 8, in which said inorganic salt is reactive with the gel forming agent to produce the calcium salt thereof.

10. A material as defined in claim 8, in which said inorganic salt is reactive with the gel forming agent to produce the lead salt thereof.

11. A material as defined in claim 8, in which said gel forming agent is an alginate.

12. A material as defined in claim 8, containing also a fluosilicate of the class consisting of alkali metal and aluminum fluosilicates.

13. A material as defined in claim 8, in which said inorganic salt is $CaSO_4 \cdot \frac{1}{2}H_2O$.

14. An elastic gel composition comprising the reaction product of a metal ion of the class consisting of lead and calcium, with an acid radical of the group consisting of alginic, pectic and carboxymethyl cellulose acids, and an alkali metal salt of a tetra carboxy acid of ethylene diamine uniformly distributed within the gel.

15. An elastic gel composition comprising the reaction product of a metal ion of the class consisting of lead and calcium, with an acid radical of the group consisting of alginic, pectic and carboxymethyl cellulose acids, and a compound of the group consisting of di, tri, and tetra potassium and sodium salts of ethylene diamine tetra acetic acid.

EDWIN H. LOCHRIDGE.

References Cited in the file of this patent

UNITED STATES PATENTS

| Number | Name | Date |
|---|---|---|
| 2,240,957 | Munz | May 6, 1941 |
| 2,308,692 | Freeman et al. | Jan. 19, 1943 |
| 2,331,858 | Freeman et al. | Oct. 12, 1943 |
| 2,390,137 | Vallandigham | Dec. 4, 1945 |
| 2,422,497 | Noyes | June 17, 1947 |
| 2,433,833 | Auer | Jan. 6, 1948 |
| 2,495,767 | Reid | Jan. 31, 1950 |
| 2,499,676 | Parr | Mar. 7, 1950 |

FOREIGN PATENTS

| Number | Country | Date |
|---|---|---|
| 324,638 | Great Britain | Jan. 27, 1930 |